(12) United States Patent
Cliff

(10) Patent No.: US 6,897,868 B2
(45) Date of Patent: May 24, 2005

(54) VISUAL REPRESENTATION OF AUDIO CONTENT

(75) Inventor: David Trevor Cliff, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 09/949,932

(22) Filed: Sep. 12, 2001

(65) Prior Publication Data
US 2002/0033823 A1 Mar. 21, 2002

(30) Foreign Application Priority Data
Sep. 20, 2000 (GB) .............................................. 0023046

(51) Int. Cl.⁷ .......................... G09T 11/00; G09T 11/20; G09G 5/22; G09G 5/24
(52) U.S. Cl. ....................... 345/440; 345/15; 345/440.1; 345/440.2
(58) Field of Search ............................ 345/440, 440.1, 345/440.2, 15

(56) References Cited

U.S. PATENT DOCUMENTS

| | | | | |
|---|---|---|---|---|
| 5,227,892 A | | 7/1993 | Lince ......................... | 358/335 |
| 5,467,288 A | * | 11/1995 | Fasciano et al. ............ | 345/716 |
| 5,601,436 A | * | 2/1997 | Sudman et al. .......... | 434/307 R |
| 5,682,326 A | * | 10/1997 | Klingler et al. .......... | 715/500.1 |
| 6,335,730 B1 | * | 1/2002 | Gould ......................... | 345/784 |
| 6,466,211 B1 | * | 10/2002 | Havre et al. ................ | 345/440 |
| 6,507,349 B1 | * | 1/2003 | Balassanian ................ | 345/676 |
| 6,563,523 B1 | * | 5/2003 | Suchocki et al. ........... | 345/833 |
| 6,665,751 B1 | * | 12/2003 | Chen et al. ................... | 710/52 |
| 2001/0047384 A1 | * | 11/2001 | Croy .......................... | 709/203 |

FOREIGN PATENT DOCUMENTS

| | | | |
|---|---|---|---|
| GB | 2235815 | 3/1991 | |
| WO | WO 91/03053 | 3/1991 | |
| WO | WO 91/13497 | 9/1991 | ............ H04B/1/00 |
| WO | WO 97/01168 | 1/1997 | ........... G11B/19/02 |

OTHER PUBLICATIONS http://www.plmsc.psu.edu/~www/matsc597/vectors/curvilinear/note4.html.*
Pages 81 and 285 Merriam Webster's Collegiate Dictionary tenth edition.*
Walker, Martin "Steinberg Wavelab 3.0", Sound On Sound vol. 15, Issue 5, 03/00 (Cambridge, UK), pp 102–106.
White, Paul "TC Works Spark 1.5", Sound On Sound vol. 15, Issue 5, 03/00 (Cambridge, UK), pp 206–210.
Search Report for Corresponding United Kingdom Patent Application No. GB 0023046.6.

* cited by examiner

Primary Examiner—Jeffery Brier
Assistant Examiner—Javid Amini

(57) ABSTRACT

Audio content on a compact disc is displayed as an image of a rotating vinyl record, thus enabling a disc jockey to obtain a visual indication of the nature of the content on the disc. The apparatus comprises a manually operable joystick which can be used to operate a compact disc player, and to cause it to play the content on the basis of the viewed image of the vinyl record, thus simulating the complete (including the visual aspect of the content recorded on a vinyl disc) functional capability of a traditional record deck and vinyl record in a compact disc player.

16 Claims, 2 Drawing Sheets

VISUAL REPRESENTATION OF AUDIO CONTENT

BACKGROUND OF THE INVENTION

1. Field of the Invention

The present invention relates, inter alia, to the visual representation of audio content, such as music, which when recorded on one or more types of data storage medium gives no visual indication to the naked eye of the nature of the content thus recorded. One example of the use of the present invention is the display of audio content recorded on a compact disc and which represents recorded music, in the visual form that the same or corresponding content would have to the naked eye when recorded on a traditional vinyl disc.

2. Description of Related Art

Currently, in spite of the widespread adoption of digitally recorded audio material in the form of compact discs, and more recently in the form of MP3 digital audio files, the vast majority of disc jockeys ("DJ's") use conventional vinyl records, played on special arrangements of record "turntables" or "decks". The arrangement of record decks typically involves having two turntables, so that the DJ can cue up a track on one record while the other is playing, or can mix music from a track on one record into the music from a track on the other record. Typically mixing will include playing music from one track over another (for example as one piece of music fades and the other starts) to provide a seamless transition from one track to another, or "scratching" during which the DJ rapidly moves one of the turntables back and forth over a short distance, causing the stylus of the turntable to move correspondingly back and forth within the spiral groove on the record, to create a characteristic sound. The reliance on the use of traditional vinyl discs and record decks is anomalous given the lower cost of recording on more modern media such as compact discs, and accordingly attempts have been made to provide special compact disc players, known as "CD decks" which aim to provide the DJ with the same capability as conventional record decks. For example CD decks include a large "jog wheel", which effectively provides manual control of the CD turntable to enable scratching. Notwithstanding this however, the use of CD decks remains low.

SUMMARY OF THE INVENTION

One aspect of the present invention lies in an appreciation of a functional capability provided to the DJ by a traditional vinyl record which is not available with existing CD decks. The majority of existing record decks for DJ's include a "target light" or "cue lamp" provided in respect of each turntable on the deck, and this allows a DJ to see the radial position of the stylus (which is useful for cueing up a track on the record). However, because the target lamp typically has a high angle of incidence to the record (i.e. subtends a small angle with respect to the surface of the record), it has the effect of illuminating the top surface and interior edges of the spiral groove on the vinyl record. Because different frequencies and amplitudes of recorded sound give rise to differing groove patterns having differing reflectances, the light reflected from a particular part of the record will be indicative of the nature of the audio content recorded on the vinyl at that location. This effect is enhanced once the record is rotating, because repetitive elements (such as drum beats or bass lines) reveal themselves as periodic variations in the groove's reflectance pattern. It is thus possible for a DJ to see a visual representation of the nature of the audio content stored on the record, which in turn enables the DJ to position the stylus by placing the stylus at an appropriate point on the record.

A further aspect of the present invention provides an apparatus for substantially replicating this functional capability so that audio content recorded on a first type of data storage medium which gives no visual indication to the naked eye of the nature of the content is visually represented in a useful manner.

Accordingly, an aspect of the present invention provides DJ apparatus comprising:

an audio player which generates an audio playback signal from a recording medium storing musical content;

a processor connected to the audio player, and adapted to: read the content and generate a visual representation of variation in at least one parameter of the content with time on a curvilinear time axis; signify an instantaneous value of the parameter on the time axis with a cursor; and synchronise temporal progression of the instantaneous value of the parameter with the audio playback signal;

a visual monitor connected to the processor, and on which the visual representation, including the cursor, is displayed;

a manual actuator, connected to the processor, and which enables a user manually to override relative motion of the cursor and time axis during the aforesaid synchronised temporal progression;

wherein the processor is additionally adapted, upon actuation of the actuator, to operate the audio player to generate an audio playback signal corresponding to instantaneous relative motion of the cursor and time axis.

The use of a curvilinear axis enables extremely efficient use of image space so that it is possible to display to a user, at any given moment, a visual representation of a much larger amount of content than would otherwise be the case. Preferably the visual representation is an image of a vinyl record, with the at least one parameter being at least frequency, and more preferably amplitude (which therefore implicitly includes frequency information). The image of the record is, according to the best mode of the invention, substantially the same as the appearance of a vinyl record on which the content is recorded, and so would be familiar to users of traditional record decks.

Typically, the content will be stored for playback in a digital audio format, having been originally recorded from an analogue audio signal, and will enable the use of standard digital data storage (such as compact discs) and data readers (such as a CD player) to produce the audio playback signal. The apparatus of the present invention will thus provide the user with the visual display capability of a traditional analogue record deck, enabling manual intervention in the playback via the actuator, and using visual feedback from the map.

The invention may be applied equally to provide this capability in conjunction with other audio content storage media, such as magnetic tapes (irrespective of whether an audio signal is recorded as analogue or digital data) to provide the user with a real time visual indication of the nature of the audio content recorded thereon.

A further aspect of the present invention provides a method of varying playback speed of musical content on an audio player which generates an audio playback signal from a recording medium storing the content, comprising the steps of:

generating a visual representation of variation in at least one parameter of the content with time on a curvilinear axis, signifying an instantaneous value of the parameter on the time axis with a cursor, and synchronising temporal progression of the instantaneous value of the parameter with the audio playback signal;

intervening in the synchronised temporal progression by moving the cursor and curvilinear time axis relative to each other; and operating the audio player to generate an audio playback signal corresponding to relative motion of the cursor and time axis resulting from the intervention.

BRIEF DESCRIPTION OF THE DRAWINGS

Embodiments of the invention will now be described, by way of example, and with reference to the accompanying drawings, in which.

DESCRIPTION OF PREFERRED EMBODIMENTS

Figure 1:
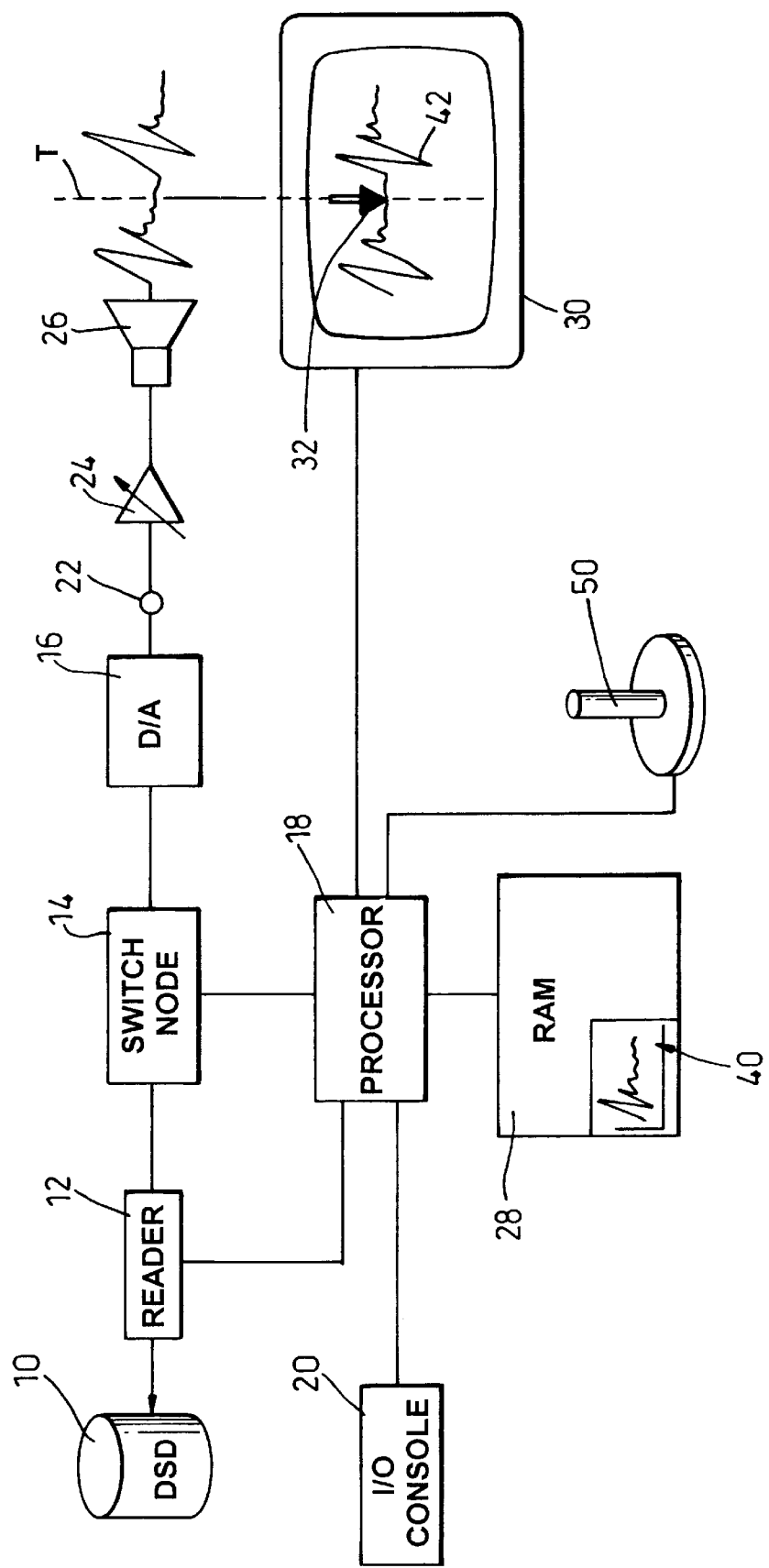
FIG. 1 is a schematic illustration of a first form of apparatus embodying aspects of the present invention.

Referring now to FIG. 1, a digital storage medium (DSD) 10, such as a compact disc, has digital audio content, typically music, stored thereon, which is readable by means of a reader 12. The reader 12 is connected, via a switch node 14 to a digital-to-analogue converter (DAC) 16 and a processor unit 18. The processor unit 18 controls the operation of, inter alia the reader 12, the DAC 16 and the switch node 14 in dependence upon input signals from a user console 20, i.e. in order to give effect to instructions input at the console by a user, requiring that audio content on a particular storage medium is output as an audio playback signal to a listener, or mapped (an explanation of which follows). Content on the storage medium is therefore read by the reader 12 in response to an instruction from the processor 18 following a suitable input instruction from a user. Upon receipt of a user instruction requiring the audio playback of the content, the processor 18 actuates the reader 12 to read the audio content from the storage medium 10, and switches the output of the reader 12, via switch node 14 to the DAC 16. The output node 22 of the DAC is typically connected via an adjustable signal amplifier 24 (the gain of which is adjustable at the console 20 to provide volume control) to one or more audio transducers such as a loud speaker 26. The "play" functional capability of the system is thus in effect identical to that of a standard audio CD player, with the reader 12, the processor 18, and the DAC 16 combining to perform this function. Upon receipt of an instruction from the console 20 to map the audio content on the storage medium, the processor 18 actuates the reader 12 and switch node 14 to read the audio content from the storage medium 10 and to transmit the audio content to the processor 18. The processor then analyses the audio content, and, by means of suitable software, compiles a visual representation, here having the form of a map 40, which in the present embodiment is a series of amplitude values of the audio content with respect to time. It is not necessary to use amplitude, and any suitable parameter may be used to create the visual representation, such as frequency. Amplitude is however preferred because it implicitly includes frequency information. This map 40 is then stored by the processor in a random access memory (RAM) 28. Upon receipt of an appropriate command from the console 20 the processor 18 is able to retrieve the map from the RAM 28 to generate an image of the map 40 upon a monitor 30. In the example of FIG. 1 the visual image of the map 40 is simply a graph 42 showing the variation in the amplitude of the audio content stored in the storage medium 10 with respect to time.

Once audio content from the storage medium has been mapped, the map image 42 is automatically generated on the monitor 30 whenever a "play" command is received at the processor 18 from the console 20. In such a situation the processor 18 switches audio content from the reader 12 through the DAC 16 to create an audio playback signal, and then to the output terminal 22, and thus the loud speaker 26. However, in contrast to the simple "play" operation described above, the audio content is initially switched to the DAC 16 via the processor 18. This process enables the processor 18 to display a cursor on the map image 42, whose instantaneous position on the image is synchronised with the audio playback signal coming out of the loud speaker 26. In the present example the cursor is simply an arrow 32 relative to which the graph of amplitude against time moves, to indicate the amplitude of the audio signal at any given moment T in time.

Providing a map image which moves relative to the cursor requires more processing capability, but this has the advantage of being able to display large data map images without having to refresh the image on the monitor, as would be required with a static map image.

By monitoring the position of the cursor on the map, a DJ is given an indication of, for example, when the beat of the music changes, or whether the music is louder or softer without listening to the music. This enables a DJ for example to locate a particular type of music on the storage medium rapidly, which is frequently necessary for example so that the DJ can synchronise two pieces of music. In one embodiment of the system described a further piece of music can be played on a second duplicate system of the system thus far described, although this has the disadvantage of requiring two readers, DACs etc. In a further embodiment the RAM 28 is sufficient large to store a map of the audio content from a storage medium and a copy of the audio content itself. The audio content from the RAM may be "played" (i.e. switched through the DAC 16 by the processor to generate an audio signal by the processor 18) and mapped in response to appropriate commands from the console 20 is the same way as described above. Thus to the user, the functional capability of the system is identical to that of two separate systems once the audio content to be stored in the RAM 28 has been mapped.

In a further modification of the system described thus far, a manual actuator is provided, here having the form of a joystick 50. The joystick 50 is connected to the processor 18, and enables a DJ to intervene manually with the audio player (whether this is a traditional player or a "player" in which an audio signal is generated from audio content stored in the RAM). By moving the joystick the DJ can alter the position of the cursor 32 on the map 40, and the processor is programmed to access and play the audio content at the instantaneous cursor position. The cursor 32 may thus be said to operate as a "virtual stylus".

The reader 12 of the various embodiments described in connection with FIG. 1 is preferably a high speed reader, i.e. it operates at a faster speed than is necessary in order to retrieve the audio content from the storage medium and convert the audio content to an audio playback signal to play the audio signal at its intended speed. This enables rapid mapping of audio content, while still permitting the audio content to be read at standard speed (i.e. the speed necessary in order to generate a playback signal for playing at its intended speed), either by means of direct control of the reader from the processor 18, or by the use of buffers, for example. However it would be possible nonetheless to use standard speed data readers, although the audio content would ideally have to be mapped in advance and the use of the virtual stylus to control the player is then only possible in respect of audio content stored in the RAM.

Figure 2:
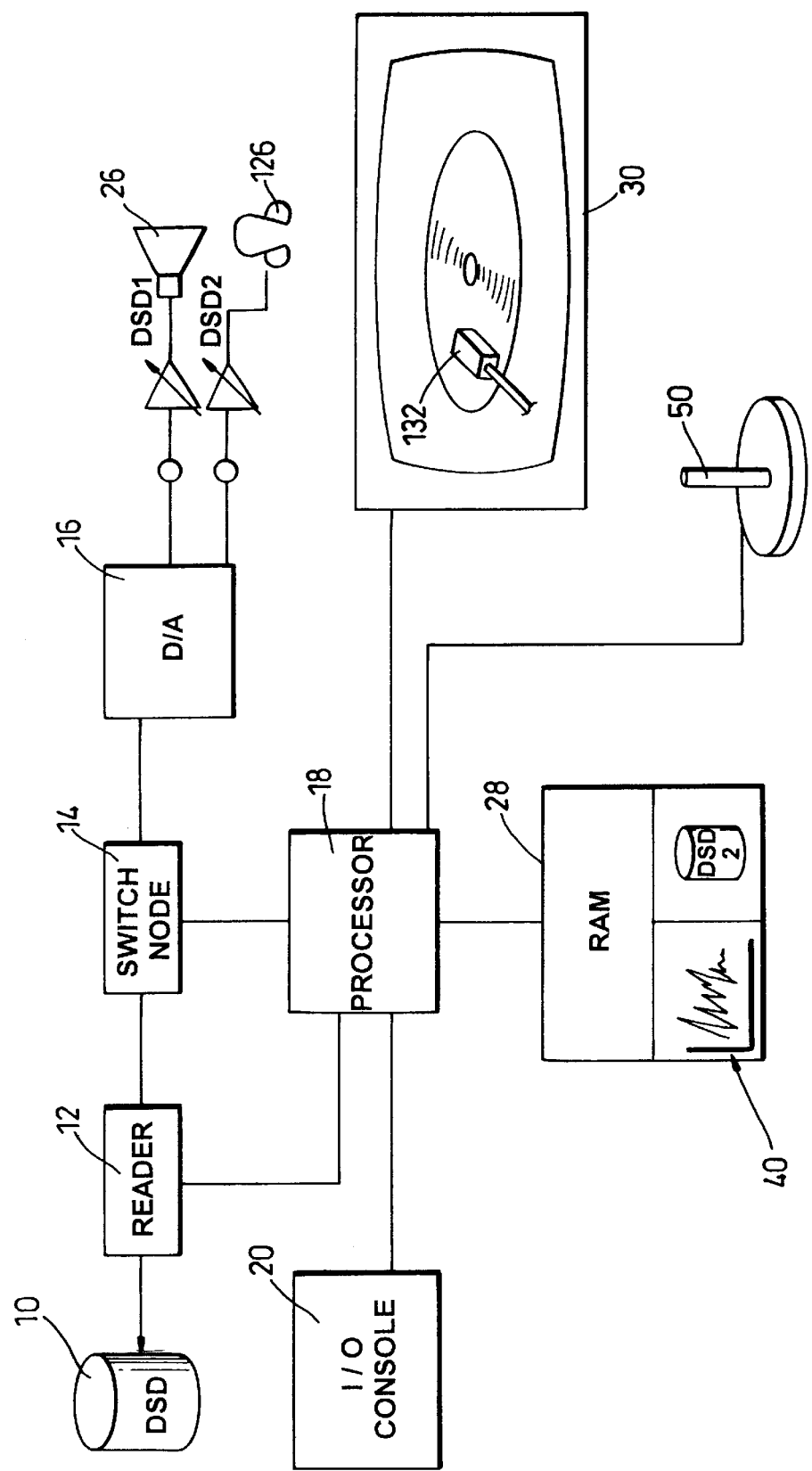
FIG. 2 is a schematic illustration of a further form of apparatus embodying aspects of the present invention.

Referring now to FIG. 2, wherein like elements are depicted with the same reference numerals, a high speed reader 12 is operable by the processor 18 in the manner previously described to read and store audio content on storage medium DSD2 in RAM 28. In this example an audio playback signal generated from audio content DSD1, stored on the storage medium 10 is playing at loud speaker 26, while the audio signal generated from audio content on DSD2 is playing in headphones 126. The monitor shows an image of the map of the audio content on DSD2, but the content on both DSD1 and DSD2 have been mapped, and selection of which map is to be displayed at any instant is possible via the console 20, as well as the selection of a split screen mode in which both map images are visible. The map images in this embodiment have the form of virtual vinyl records on which the audio content on DSD1, DSD2 is recorded; the cursor is depicted as a stylus 132 moving across the surface of the vinyl record disc. The position of the stylus image on either of the virtual vinyl records in adjustable using the joystick 50, with selection of the map in respect of which the joystick is operable being possible via the console 20. In a preferred embodiment the joystick 50 is integrated into the console 20 for ease of use.

The processor is thus controllable from the console 20 to move the cursor 132 to a particular position on an image of what the audio content would look like in the event that it had been recorded on a vinyl record disc (the medium most favoured by current DJ's), in order to play the audio signal corresponding to the audio content at the new cursor position. The volume of either output channel may be faded out etc. in the same way as with existing systems in order to mix audio playback signals generated from audio content on storage media DSD1 and DSD2.

What is claimed is:

1. A method of varying playback speed of musical content on an audio player which generates an audio playback signal from a recording medium storing the content, comprising the steps of: generating a visual representation of variation in at least one parameter of the content with time on a curvilinear axis in the image of a grooved disc record, signifying an instantaneous value of the parameter on the axis with a cursor, and synchronizing temporal progression of the instantaneous value of the parameter with the audio playback signal; intervening in the synchronized temporal progression by moving the cursor and curvilinear axis relative to each other; and operating the audio player to generate an audio playback signal corresponding to relative motion of the cursor and axis resulting from the intervention.

2. A method according to claim 1 wherein in the visual representation of the parameter, temporal progression is signified by moving the curvilinear axis relative to the cursor.

3. A method according to claim 1 wherein the image of the record has an appearance substantially the same as a genuine vinyl record on which the musical content is recorded.

4. A method according to claim 3 wherein the audio player is a CD player, and the visual representation is an image of a grooved vinyl disc record.

5. A method according to claim 4 wherein the image of the vinyl record rotates relative to the cursor.

6. A method according to claim 5 wherein the cursor is an image of a stylus on the vinyl record.

7. DJ apparatus comprising: an audio player which generates an audio playback signal from a recording medium storing musical content; a processor connected to the audio player, and adapted to: read the content and generate a visual representation of variation in at least one parameter of the content with time on a curvilinear axis in the image of a grooved disc record; signify an instantaneous value of the parameter on the axis with a cursor; and synchronize temporal progression of the instantaneous value of the parameter with the audio playback signal; a visual monitor connected to the processor, and on which the visual representation, including the cursor, is displayed; a manual actuator, connected to the processor, and which enables a user manually to override relative motion of the cursor and curvilinear axis during the aforesaid synchronized temporal progression; wherein the processor is additionally adapted, upon actuation of the actuator, to operate the audio player to generate an audio playback signal corresponding to instantaneous relative motion of the cursor and axis.

8. Apparatus according to claim 7 wherein in the visual representation, the curvilinear axis rotates relative to the cursor.

9. Apparatus according to claim 8 wherein the cursor is an image of a stylus.

10. Apparatus according to claim 7 wherein the audio player is a CD player, and the content is stored on a CD.

11. Apparatus according to claim 7 comprising scanning means for scanning the CD at a speed higher than the audio playback signal, in order to obtain data to generate the visual representation in advance of the audio playback signal.

12. Apparatus according to claim 11 wherein the scanning means is provided by the audio player operable in a high speed mode.

13. A method of visually representing musical content stored on a recording medium and output as an audio playback signal from an audio player, comprising the steps of: generating a visual representation of variation in at least one parameter of the content with time on a curvilinear axis in the image of a grooved disc record; signifying an instantaneous value of the parameter on the axis with a cursor; and synchronizing temporal progression of the instantaneous value of the parameter with the audio playback signal.

14. A method according to claim 13 wherein the image of the record rotates relative to the cursor.

15. A method according to claim 14 wherein the image of the record has an appearance substantially similar to a vinyl record on which the content is recorded.

16. A method according to claim 13 further comprising the steps of: intervening in the aforesaid synchronized temporal progression by moving the cursor and curvilinear axis relative to each other, and operating the audio player to generate an audio playback signal corresponding to the relative motion of the cursor and axis.

* * * * *